United States Patent
Chang et al.

(10) Patent No.: US 7,099,052 B2
(45) Date of Patent: Aug. 29, 2006

(54) SCANNER WITH A CONTROLLER FOR CONTROLLING MOVEMENT OF A SCANNING MODULE DURING SCANNER MAINTENANCE

(75) Inventors: Yuing Chang, Hsin-Chu (TW); Sung-Po Cheng, Hsin-Chu (TW)

(73) Assignee: Avision Inc., (TW)

( * ) Notice: Subject to any disclaimer, the term of this patent is extended or adjusted under 35 U.S.C. 154(b) by 889 days.

(21) Appl. No.: 10/064,354

(22) Filed: Jul. 4, 2002

(65) Prior Publication Data
US 2003/0210436 A1  Nov. 13, 2003

(30) Foreign Application Priority Data
May 9, 2002 (TW) ................ 91109717 A (51) Int. Cl.
*H04N 1/04* (2006.01)
*H04N 1/00* (2006.01)

(52) U.S. Cl. ............ 358/474; 358/497; 358/406; 358/471

(58) Field of Classification Search ........ 358/406, 358/497.494, 474, 471, 496, 401, 504, 505, 358/437, 441; 382/312, 318, 319; 399/210–213, 399/36, 13, 11, 9; 250/234–236, 216, 239
See application file for complete search history.

(56) References Cited

U.S. PATENT DOCUMENTS 4,967,233 A * 10/1990 Buchar et al. ............ 358/496
5,635,973 A * 6/1997 Yamada .................... 347/171

FOREIGN PATENT DOCUMENTS

JP       02218262 A * 8/1990

\* cited by examiner

*Primary Examiner*—Cheukfan Lee (57) ABSTRACT

A scanner with a controller for controlling movement of a scanning module during scanner maintenance is provided. The scanner includes a housing, a transparent platform, and a scanning module installed inside the housing for scanning a document. The scanning module can move from a home position to a position corresponding to the document. The scanner also includes a driving device for driving the scanning module and for driving the scanning module back to the home position after the scanning module has scanned the document, and a controller for controlling the driving device. When the scanning module is at the home position, the controller can cause the driving device to drive the scanning module to a maintenance position and stop the scanning module at the maintenance position.

9 Claims, 7 Drawing Sheets

SCANNER WITH A CONTROLLER FOR CONTROLLING MOVEMENT OF A SCANNING MODULE DURING SCANNER MAINTENANCE

BACKGROUND OF INVENTION

1. Field of the Invention

The present invention relates to a scanner, and more particularly, to a scanner having a controller for controlling movement of a scanning module during scanner maintenance.

2. Description of the Prior Art

Figure 1:
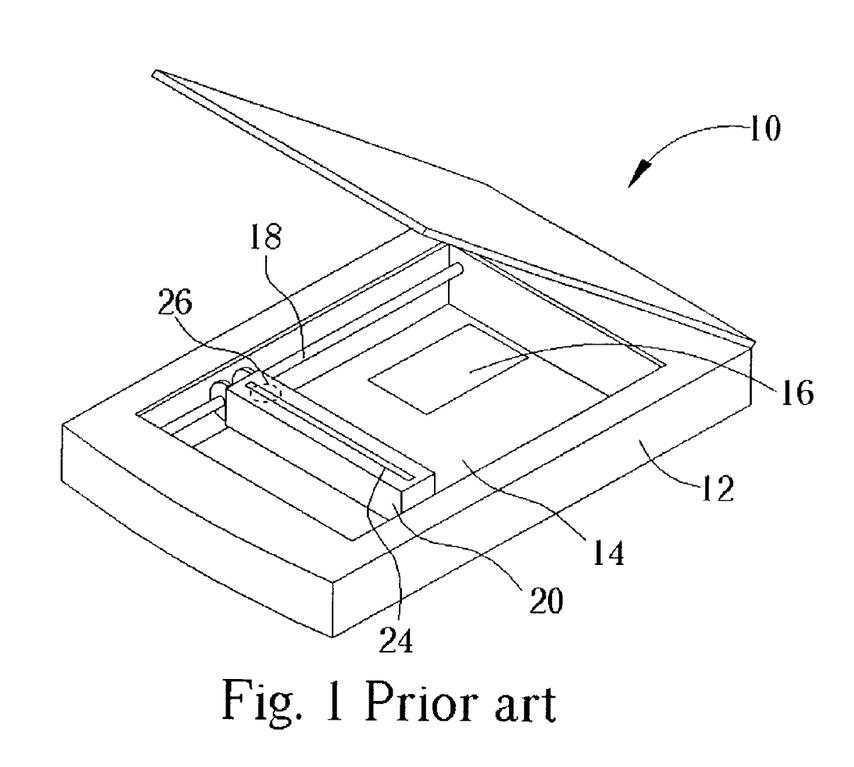
FIG. 1 is a schematic diagram of a prior art scanner.

Please refer to FIG. 1, which is a schematic diagram of a prior art scanner 10. The scanner 10 comprises a housing 12, a transparent platform 14 installed on the housing 12 for a document 16 to be placed thereon, a track 18 installed inside the housing 12, and a scanning module 20 installed on and able to slide along the track 18 for scanning the document 16 and for generating corresponding image signals. The scanning module 20 further comprises a light-emitting device 24 (such as a fluorescent light) for projecting light onto the document 16. The scanning module 20 also comprises a driving device 26 (shown as dotted lines) for driving the scanning module 20 back and forth along the track 18.

Figure 2:
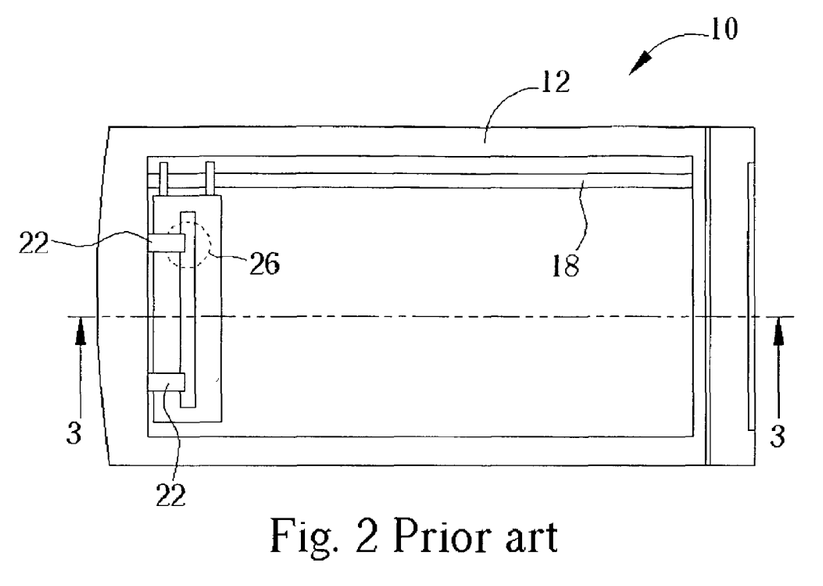
FIG. 2 is a top view diagram of the scanner shown in FIG. 1.
Figure 3:
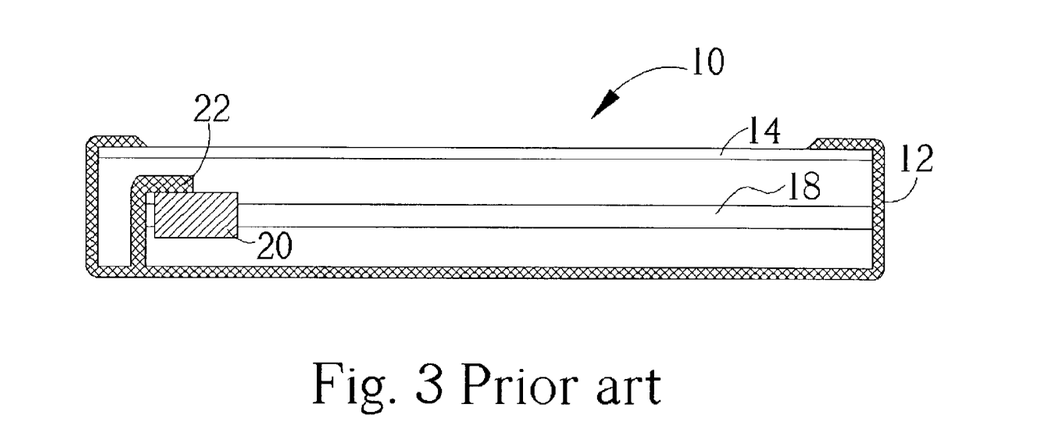
FIG. 3 is a cross-sectional diagram along line 3—3 of the scanner shown in FIG. 2.

Please refer to FIG. 2 and FIG. 3. FIG. 2 is a top view diagram of the prior art scanner 10 shown in FIG. 1. FIG. 3 is a cross-sectional diagram along line 3—3 shown in FIG. 2. The scanner 10 also comprises a pair of hooks 22 installed inside the housing 12 and positioned at the same side as the home position. Whenever the scanning module 20 returns to the home position, the scanning module 20 always stays under the hooks 22. The scanning module 20 inlays itself into the hooks 22 from touching or even from destroying the transparent platform 14 during a delivery.

Figure 4:
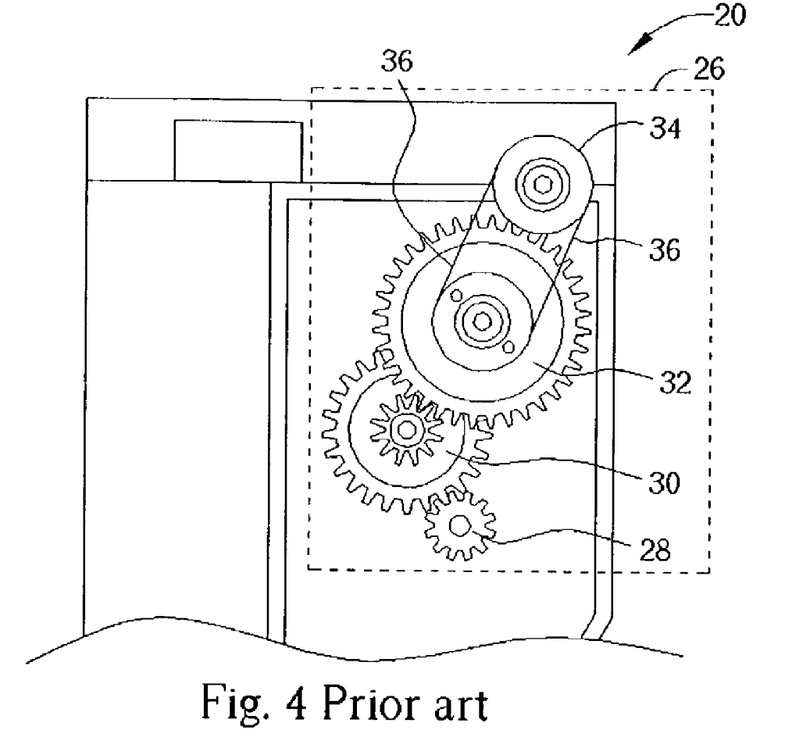
FIG. 4 is a partial side view diagram of a scanning module of the prior art scanner.

Please refer to FIG. 4, which is a partial bottom view diagram of the scanning module 20. The driving device 26 comprises a step motor (not shown) for turning an driving gear 28 around, a plurality of driven gears 30, 32 for transforming a high angular velocity of the driving gear 28 to a low angular velocity, a belt wheel 34, and a belt 36. The step motor turns the driving gear 28 around, which drives the driven gears 30, 32. The belt 36 of the driven gear 32 then spins the belt wheel 34 to drive the scanning module 20 to move back and forth along the track 18.

In general, the scanner 10 executes a setup process before it scans the document 16. After the scanner 10 has executed the setup process, the scanning module 20 stays at the home position under the hooks 22 (as shown in FIG. 3). When the scanner 10 is scanning the document 16, the driving device 26 drives the scanning module 20 to move along the track 18 from one end of the track 18 (home position) to the other end of the track 18 and drives the scanning module 20 to move backward along the track 18 until the scanning module 20 reaches the home position. If interrupted by a power failure or by an unexpected incident, the scanner 10 will still execute the setup process first after the power has recovered or the unexpected incident has been resolved. That is, no matter what position the scanning module 20 is in before the power interruption, the scanning module 20 will always move to the home position and stay there again after the scanner 10 has executed the setup process.

When a maintenance worker is about to disassemble the scanning module 20 from the scanner 10 or to repair some components inside the scanner 10, the maintenance worker has to push the scanning module 20 manually along the track 18 out from the hooks 22. However, because the gears 28, 30, 32 of the driving device 26 are designed as active driving elements (for the scanning module 20) and are hard to be driven passively, moving the scanning module 20 by hand is not always stable. Moving the scanning module 20 manually always reduces the accuracy of the scanning module 20 and even damages the driving device 26. Moreover, some driving devices of modern scanners are manufactured by a combination of worm gears and worm rods, so moving a scanning module of a scanner manually has become a difficult task.

SUMMARY OF INVENTION

It is therefore a primary objective of the claimed invention to provide a scanner to solve the above-mentioned problems.

According to the claimed invention, a scanner with a controller for controlling movement of a scanning module during scanner maintenance is provided. The scanner includes a housing, a transparent platform installed on the housing for a document to be placed on, and a scanning module installed inside the housing for scanning the document. The scanning module is capable of moving from a home position to a position corresponding to the document. The scanner also includes a driving device for driving the scanning module and for driving the scanning module back to the home position after the scanning module has scanned the document, and a controller for controlling the driving device. When the scanning module stops at the home position, the controller is capable of controlling the driving device to drive the scanning module to a maintenance position. The maintenance position is different from the home position. Then the controller causes the driving device to stop driving the scanning module so that the scanning module remains in the maintenance position.

It is an advantage of the claimed invention that when scanner maintenance is required, a maintenance worker is able to control the driving device to drive the scanning module to a maintenance position by operating the controller. Once the scanning module is in the maintenance position, corresponding components of the scanner can be disassembled. Having the scanning module in the maintenance position not only saves precious maintenance time, but also prevents damage to the scanning module caused by hand-exertions of the maintenance worker.

These and other objectives of the claimed invention will no doubt become obvious to those of ordinary skill in the art after reading the following detailed description of the preferred embodiment that is illustrated in the various figures and drawings.

DETAILED DESCRIPTION

Figure 5:
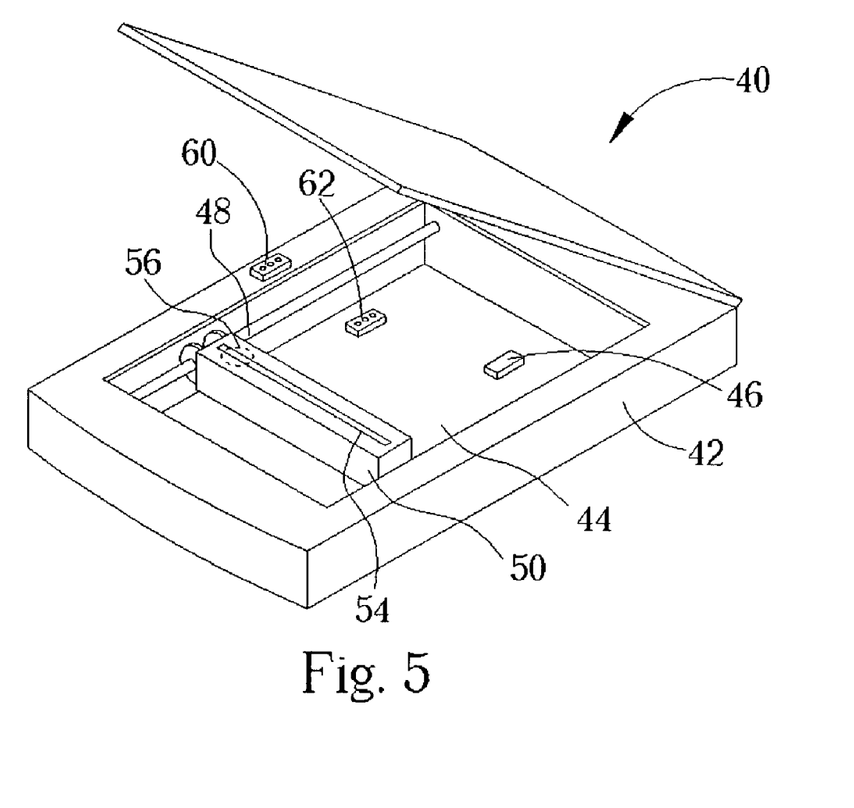
FIG. 5 is a schematic diagram of a scanner according to the present invention.

Please refer to FIG. 5, which is a schematic diagram of a scanner 40 according to the present invention. The scanner 40 comprises a housing 42, a transparent platform 44 installed on the housing 42 for a document (not shown) to be placed on, a track 48 positioned inside the housing 42, and a scanning module 50 installed and able to slide on the track 48 for scanning the document, and for generating corresponding image signals. The scanner 40 also comprises a controller 46 installed inside the housing 42 and electrically connected (not shown) to the scanning module 50 for controlling the scanner 40 and for controlling the scanning module 50, a driving device 56 for driving the scanning module 50 to move along the track, and a light-emitting device 54 installed on the scanning module 50 for projecting light onto the document.

Figure 6:
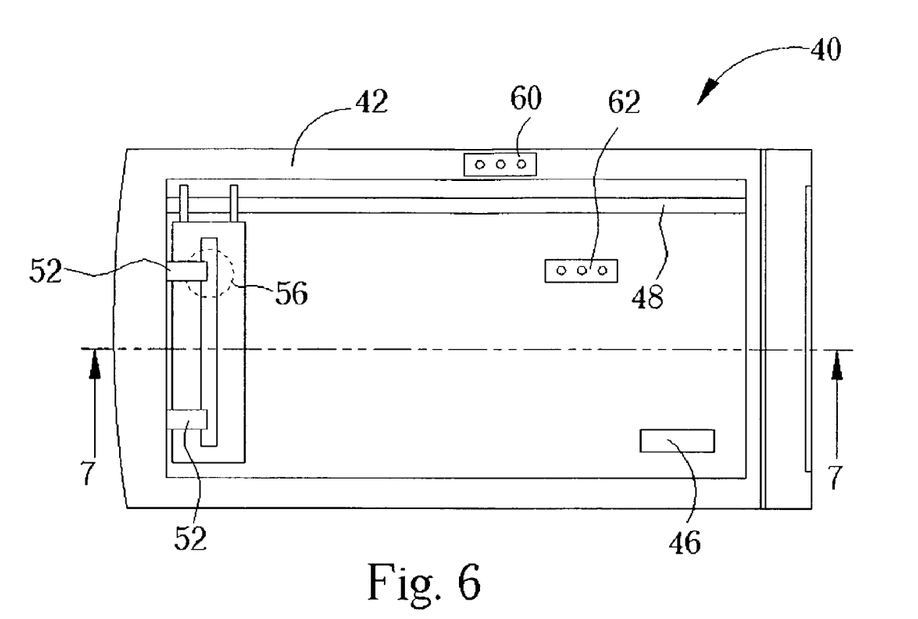
FIG. 6 is a top view diagram of the scanner shown in FIG. 5.
Figure 7:
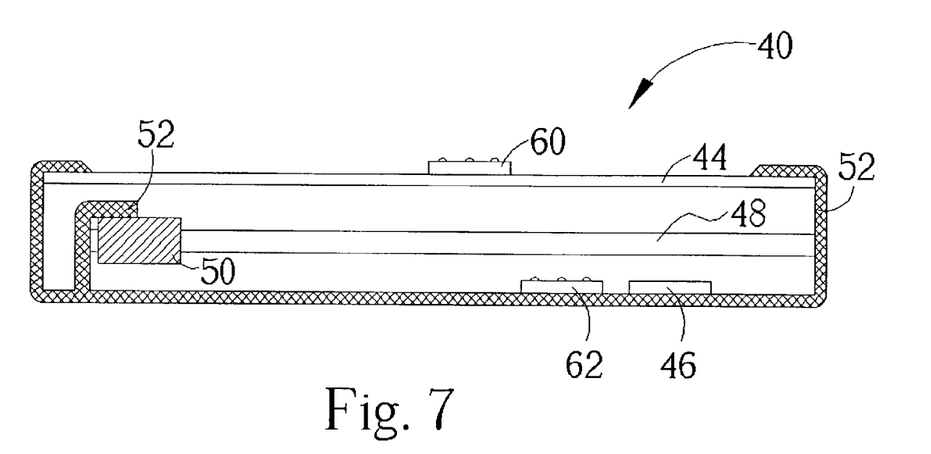
FIG. 7 is a cross-sectional diagram along line 7—7 of the scanner shown in FIG. 6.

Please refer to FIG. 6 and FIG. 7. FIG. 6 is a top view diagram of the scanner 40 shown in FIG. 5. FIG. 7 is a cross-sectional diagram along line 7—7 shown in FIG. 6. In FIG. 7, the scanning module 50 has moved to a home position. Similar to the prior art scanner 10, the scanner 40 also comprises a pair of hooks installed inside the housing 42 and positioned on the same side as the home position for preventing the scanning module 50 from touching or damaging the transparent platform 44.

Similarly, the scanning module 50 of the scanner 40 always stays at the home position while the scanner 40 is not scanning a document. However, a user or a maintenance worker is capable of controlling the driving device 56 via the controller 46 to drive the scanning module 50 away from the home position (that is, away from the hooks 52) and of controlling the driving device 56 to stop driving the scanning module 50 so that the scanning module 50 remains in the maintenance position (such as a position shown in FIG. 5). Therefore, the user or the maintenance worker can inspect or even can disassemble some components inside the scanner 40.

Because important components, such as a mother board, of the scanner 40 are installed in the vicinity of the home position, the user or the maintenance worker has to disassemble the scanning module 50 or to move the scanning module 50 away from the home position before disassembling the relative components. After completing the maintenance work, the user or the maintenance worker installs the repaired components back into the scanner 40 and then re-installs the scanning module 50 (if it was removed). After executing a reset process, the scanner 40 is ready to scan a document. The scanning module 50 has already moved back to the home position, where is under the hooks 52.

There are many ways for the controller 46 to cause the driving device 56 to drive the scanning module 50 to the maintenance position. The first way is using a scanner drive program used for driving the scanner 40 to control movement of the scanning module 50. For example, the scanner 40 is usually connected to a personal computer (PC) and the scanner driving program stored in the PC is used to control the scanner 40. A new maintenance function can be added into the scanner driving program that is capable of letting the user or the maintenance worker control the driving device 56 to drive the scanning module 50 from the home position to the maintenance position and to keep the scanning module 50 there.

The second way is that the scanner 40 can install a plurality of switches thereon to control movement of the scanning module 50. Please refer to FIG. 5 through FIG. 7 again. The scanner 40 shown in FIG. 5 further comprises a user control switch 60 and a maintenance worker control switch 62, both for controlling movement of the scanning module 50. The user control switch 60 is installed on a top of the scanner 40 and is an ordinary scanner control switch. A user or a maintenance worker is capable of operating the control switch 60 with a special mode to control the driving device 56 to drive the scanning module 50 to the maintenance position. Because a usual scanner is installed with a control switch with a "start scanning" button, the control switch 60 can be part of the control switch of a conventional scanner. For example, when a user presses the "start scanning" button one time, the scanner 40 works normally. When a user presses the "start scanning" button three times in rapid succession, the driving device 56 will drive the scanning module 50 to the maintenance position. Thus, the user can easily disassemble the scanning module 50 or some components inside the scanner 40.

Furthermore, the control switch for triggering the scanning module 50 to move to the maintenance position can be also installed inside the housing 42 of the scanner 40, such as a maintenance worker control switch 62 shown in FIG. 5. When a maintenance worker is about to repair some components inside the scanner 40, the maintenance worker opens the transparent platform 44 first and then controls the driving device 56 to drive the scanning module 50 to the maintenance position by operating the maintenance worker control switch 62. Of course, the above-mentioned control switches 60, 62 can be selectively installed inside or on top of the scanner 40.

When a user examines the scanner 40 or some components of the scanning module 50 for the first time, the user is capable of controlling the driving device 56 via the user control switch 60 to drive the scanning module 50 away from the home position to an ideal maintenance position. That is, the scanning module 50 moves away from a non-transparent housing positioned above the hooks 52 and stays at the ideal maintenance position. Then the user can examine the components inside the scanner 40. As described previously, after examining the relative components of the scanner 40, the user resets the scanner 40 by operating the user control switch 60 and the scanning module 50 will then move back to the home position.

Another possibility is when a maintenance worker is about to examine some components of the scanner 40, the maintenance worker has to open the transparent platform 44 first and then operates the maintenance worker control switch 62 to control the driving device 56 to drive the scanning module 50 away from the home position to an ideal maintenance position. Similarly, having examined (or repaired) relative components of the scanner 40, the maintenance worker reassembles the examined components back into the scanner 40 and resets the scanner 40 by operating the maintenance worker control switch 62. Then the scanning module 50 moves as usual back to the home position.

The above-mentioned switches 60, 62 can be selectively installed inside or on top of the scanner 40, or can be designed as multi-stage switches or tuning switches depending on the circumstance. For example, there can be more than one maintenance position located along the track 48, and each maintenance position is not identical to the home position. The switches 60, 62 are capable of controlling the driving device 56 to drive the scanning module 50 to move to and to stay at each maintenance position one by one. Moreover, when the scanning module 50 parked at a maintenance position, the controller 46 of the scanner 40 can also selectively turn off the light-emitting device 54 or leave the light-emitting device 54 turned on.

As an additional alternative to switches, because a conventional scanner has a built-in power-sensing device, unplugging and plugging-in the scanner three times in rapid succession or some similar method may be used to cause a driving device installed in the scanner to drive a scanning module of the scanner to a maintenance position. In such a way, the plurality of switches 60, 62 are no longer necessary.

In contrast to the prior art, the scanner 40 having a controller 46 for controlling movement of the scanning module 50 can use the driving device 56 to drive the scanning module 50 away from a position where the hooks 52 are positioned before a maintenance worker examines the scanner 40. Such a way can prevent the scanning module 50 from damage and can save much time in repairing the scanner 40.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:
   a housing;
   a transparent platform installed on the housing for a document to be placed on;
   a scanning module installed inside the housing for scanning the document, the scanning module being moveable from a home position to a position corresponding to the document;
   a driving device for driving the scanning module and for driving the scanning module back to the home position after the scanning module has scanned the document; and
   a controller for controlling the driving device;
   wherein when the scanning module stops at the home position, the controller controls the driving device to drive the scanning module to a maintenance position, the maintenance position being different from the home position, and then controls the driving device to stop driving the scanning module so that the scanning module remains in the maintenance position.

2. The scanner of claim 1 further comprising a plurality of hooks installed inside the housing for preventing the scanning module from touching the transparent platform.

3. The scanner of claim 1 wherein the controller comprises at least one controlling switch; when a user touches the controlling switch, the controller then controls the driving device to drive the scanning module to the maintenance position.

4. The scanner of claim 3 wherein the controlling switch is installed on the housing.

5. The scanner of claim 3 wherein the controlling switch is installed on an inner surface of the housing.

6. The seamier of claim 1 wherein the controller comprises a plurality of controlling switches for managing the scanning module according to managements of a user; when the user touches the controlling witches according to a predetermined mode, the controller controls the driving device to drive the scanning module to the maintenance position.

7. The scanner of claim 1 wherein the maintenance position is adjacent to the transparent platform.

8. The scanner of claim 1 further comprising a track installed inside the housing for the scanning module to slide thereon.

9. The scanning of claim 1 wherein the scanning module comprises a light-emitting device for emitting light onto the document; when the scanning module stops at the maintenance position, the light device stops emitting light.

* * * * *